United States Patent
Song

(10) Patent No.: US 6,947,476 B2
(45) Date of Patent: Sep. 20, 2005

(54) METHOD FOR SYNCHRONIZING FRAME BY USING PILOT PATTERN IN COMPRESSED MODE

(75) Inventor: Young Joon Song, Kyonggi-do (KR)

(73) Assignee: LG Electronics Inc., Seoul (KR)

(*) Notice: Subject to any disclaimer, the term of this patent is extended or adjusted under 35 U.S.C. 154(b) by 709 days.

(21) Appl. No.: 09/783,041

(22) Filed: Feb. 15, 2001

(65) Prior Publication Data

US 2001/0021236 A1 Sep. 13, 2001

(30) Foreign Application Priority Data

Feb. 16, 2000 (KR) .......................................... 2000-7328
Feb. 17, 2000 (KR) .......................................... 2000-7602

(51) Int. Cl.[7] .......................... H04B 15/00; H04K 1/00; H04L 27/30
(52) U.S. Cl. ................... 375/149; 375/150; 375/142; 375/365; 375/343; 370/509
(58) Field of Search ................. 375/365–368, 375/343, 145, 149, 150, 142; 370/509, 510, 512–515, 337

(56) References Cited

U.S. PATENT DOCUMENTS

| | | | |
|---|---|---|---|
| 5,844,907 A | * 12/1998 | Uchiki et al. ................ 370/517 |
| 5,991,330 A | 11/1999 | Dahlman et al. ............ 375/200 |
| 6,084,865 A | * 7/2000 | Dent ............................ 370/321 |
| 6,118,825 A | * 9/2000 | Ikeda et al. .................. 375/259 |
| 6,549,544 B1 | * 4/2003 | Kroeger et al. ............. 370/482 |
| 6,618,367 B1 | * 9/2003 | Riazi et al. .................. 370/347 |

FOREIGN PATENT DOCUMENTS

EP 0 905 941 A1 3/1999

OTHER PUBLICATIONS

3rd Generation Partnership Project (3GPP) Technical Specification Group Radio Access Network Multiplexing and Channel Coding (FDD) (3G TS 25.212 version 3.3.0) (XP–002149187).

* cited by examiner

Primary Examiner—Phuong Phu
(74) Attorney, Agent, or Firm—Fleshner & Kim, LLP

(57) ABSTRACT

Method for synchronizing frames by using pilot patterns in a compressed mode. In a case a W-CDMA mobile communication system is operated in a compressed mode, the present invention permits to restore perfect frame synchronization words in frames by using dedicated pilot sequence pattern, and achieve frame synchronization by using correlation of the restored frame synchronization words, even if all the 15 slots of one frame are not transmitted.

16 Claims, 8 Drawing Sheets

$R_1(\tau)+R_2(\tau)+R_3(\tau)+R_4(\tau)$ $R_{1,2}(\tau)+R_{2,1}(\tau+1)+R_{3,4}(\tau)+R_{4,3}(\tau+1)$ channel bits encoding into
STTD for both antenna1 and antenna2

METHOD FOR SYNCHRONIZING FRAME BY USING PILOT PATTERN IN COMPRESSED MODE

BACKGROUND OF THE INVENTION

1. Field of the Invention

The present invention relates to a method for synchronizing frames by using pilot patterns in a compressed mode.

2. Background of the Related Art

Recent 3GPP(Third Generation Partnership Project) has description of a transport channel and physical channel for further developed next generation mobile communication. With regard to the physical channel, a DPCH (Dedicated Physical Channel) is used for an up link and a downlink. In general, the DPCH consists of hierarchal layers of super frames, radio frames, and time slots. There are two types of DPCH; one is a DPDCH (Dedicated Physical Data Channel) and the other one is a DPCCH (Dedicated Physical Control Channel). The DPDCH is for transportation of dedicated data, and the DPCCH is for transportation of control information. The DPCCH has a plurality fields, such as a pilot, a TFCI, an FBI, and a TPC. The pilot $N_{pilot}$ is provided with pilot bits (or symbols) for supporting channel estimation for making coherent detection, and pilot bits (or symbols) for frame synchronization. Particularly, it is very important to make, identify, and failure detection of frame synchronization by using pilot patterns of the pilot $N_{pilot}$, at a receiver side of the next generation mobile communication system. The following table 1 shows frame synchronization words used in the up link and down link DPCH.

TABLE 1

Frame Synchronization Words $C_1$ = (1 0 0 0 1 1 1 1 0 1 0 1 1 0 0)
$C_2$ = (1 0 1 0 0 1 1 0 1 1 1 0 0 0 0)
$C_3$ = (1 1 0 0 0 1 0 0 1 1 0 1 0 1 1)
$C_4$ = (0 0 1 0 1 0 0 0 0 1 1 1 0 1 1)
$C_5$ = (1 1 1 0 1 0 1 1 0 0 1 0 0 0 1)
$C_6$ = (1 1 0 1 1 1 0 0 0 0 1 0 1 0 0)
$C_7$ = (1 0 0 1 1 0 1 0 1 1 1 1 0 0 0)
$C_8$ = (0 0 0 0 1 1 1 0 1 1 0 0 1 0 1)

The codes in the table 1 have auto-correlation function as expressed in the following equation (1).

$$R_i(\tau) = \begin{cases} 15, & \tau = 0 \\ -1, & \tau \neq 0 \end{cases}, i = 1, 2, \ldots, 8 \quad (1)$$

The $R_{im}(\tau)$ in the equation (1) is an auto-correlation function of a frame synchronization word $C_i$. The codes in the table 1 may be classed in four as expressed in the following equation (2).

$$E=\{C1, C2\}, F=\{C3, C4\}, G=\{C5, C6\}, H=\{C7, C8\} \quad (2)$$

Each of code pairs in each class has a cross correlation function as expressed in the following equations (3) and (4).

$$R_{i,j}(\tau) = \begin{cases} -15, & \tau = 7 \\ 1, & \tau \neq 7 \end{cases} \quad (3)$$

$$R_{j,i}(\tau+1) = \begin{cases} -15, & \tau = 7 \\ 1, & \tau \neq 7 \end{cases} \quad (4)$$

Where i, j=1, 2, . . . , 8, and $R_{i,j}(\tau)$ represents a cross-correlation function between code pairs in each of the classes E, F, G, H. Eventually, a result of correlation as expressed in the following equation (5) can be obtained by appropriate combination of the frame synchronization words according to the auto-correlation function as expressed in the equation (1), and a correlation result as the following equation (6) can be obtained by appropriate combination of codes in each of the classes according to the cross-correlation function as expressed by the equations (3) and (4).

$$\sum_{i=1}^{\alpha} R_i(\tau) = \begin{cases} \alpha \cdot 15, & \tau = 0 \\ -\alpha, & \tau \neq 0 \end{cases}, \alpha = 1, 2, 3, \ldots, 8 \quad (5)$$

$$\sum_{o=1}^{\alpha/2} (R_{2i-1,2i}(\tau) + R_{2i,2i-1}(\tau+1)) = \begin{cases} -\alpha \cdot 15, & \tau = 0 \\ \alpha, & \tau \neq 0 \end{cases}, \alpha = 1, 2, 3, \ldots, 8 \quad (6)$$

FIG. 1A illustrates a graph showing an auto-correlation result when α=2 in the equation (5), and FIG. 1B illustrates a graph showing a cross-correlation result between codes in the same class when α=2 in the equation (6). FIG. 2A illustrates a graph showing an auto-correlation result when α=4 in the equation (5), and FIG. 2B illustrates a graph showing a cross-correlation result between a pair of codes of class 'E' and 'F' when α=4 in the equation (6). For an example, as can be known from FIG. 2A, the auto-correlation function of the frame synchronization words shown in table 1 has a maximum correlation result at a delay time point '0' (τ=0), and a minimum correlation result at a sidelobe which is a delay time point other than the delay time point '0'. As can be known from FIG. 2B, the cross-correlation function of each code pair of the frame synchronization words in the same class shows a maximum correlation result of a negative polarity at a middle delay point τ=7.

Thus, in the related art, the frame synchronization is attained, and identified by using correlation of the frame synchronization words shown in table 1. However, though a performance of attaining the frame synchronization can be made properly when 15 slots are transported for one frame, the performance can not be made properly when a minimum 8 slots and maximum 14 slots are transported for one frame like in a compressed mode which is a character of a W-CDMA. Moreover, in the related art, correlation of pilot patterns are made for identification of frame synchronization and detection of the out-of frame synchronization. When identification of the frame synchronization and detection of the out-of frame synchronization is made from a result of pilot pattern correlation, a preset threshold value is provided in the related art for comparing the correlation value calculated for each slot and the threshold value, to identify the synchronization and detect an out-of synchronization.

However, it is evident that the threshold values in the related art set freely as the mobile station UE or the base station Node B likes causes failure in the frame synchronization identification or out-of frame synchronization detection owing to different threshold values, that may be one of great problem in global roaming the next generation mobile communication system pursues. Accordingly, a universal reference for determining the frame synchronization identification and the out-of frame synchronization detection is required, and a method for making positive frame synchronization identification and detection of out-of frame synchronization is required.

SUMMARY OF THE INVENTION

Accordingly, the present invention is directed a method for synchronizing frames by using pilot patterns in a compressed mode that substantially obviates one or more of the problems due to limitations and disadvantages of the related art An object of the present invention is to provide a method for synchronizing frames by using pilot patterns in a compressed mode, which can achieve a perfect synchronization even in a case a W-CDMA mobile communication system is in the compression mode.

Another object of the present invention is to provide a method for synchronizing frames by using pilot patterns in a compressed mode, which can provide a reference for identification of the frame synchronization or detection of the out-of frame synchronization.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. To achieve these and other advantages and in accordance with the purpose of the present invention, as embodied and broadly described, frame synchronization words are restored in frame perfectly by using dedicated pilot patterns. The frame synchronization is achieved by using correlation of the restored frame synchronization words.

In one aspect of the present invention, frame synchronization words to be transmitted over one frame from a transmission side are punctured as many as desired number of slots. Upon receiving a series of codes of the punctured frame synchronization words at a receiver side, the frame synchronization words are restored in frames by using correlation of the received series of codes. Frame synchronization is attained with respect to a channel by using correlation of the restored frame synchronization words.

Preferably, in the step to restore the frame synchronization words, bits of the codes not transmitted owing to the puncturing are restored by using a relation $C_{ij}=-C_{i+1(j+7)mod\ 15}$ of a code pair in each of the classes, and bits of the codes not transmitted owing to the puncturing are restored by using a relation $C_{i+1,j}=-C_{i,(j+8)mod\ 15}$ of a code pair in each of the classes. Preferably, for perfect frame synchronization, the restored frame synchronization words which are pilot bit sequences, are auto-correlated and cross correlated. The auto-correlation result and the cross correlation result are negatively summed, and compared to a preset threshold value $\beta$. A frame synchronization success for the received channel is determined according to a result of the comparison, and reported to an upper layer.

Preferably, the restored frame synchronization words are classed into a number of classes corresponding to frame synchronization word pairs, and one word of the frame synchronization word pair in one class is the other word being cyclic shifted by 7 bits and inverted.

The threshold value $\beta$ is set to a value equal to '0' or greater than '0' depending on an SNR ratio.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 3:
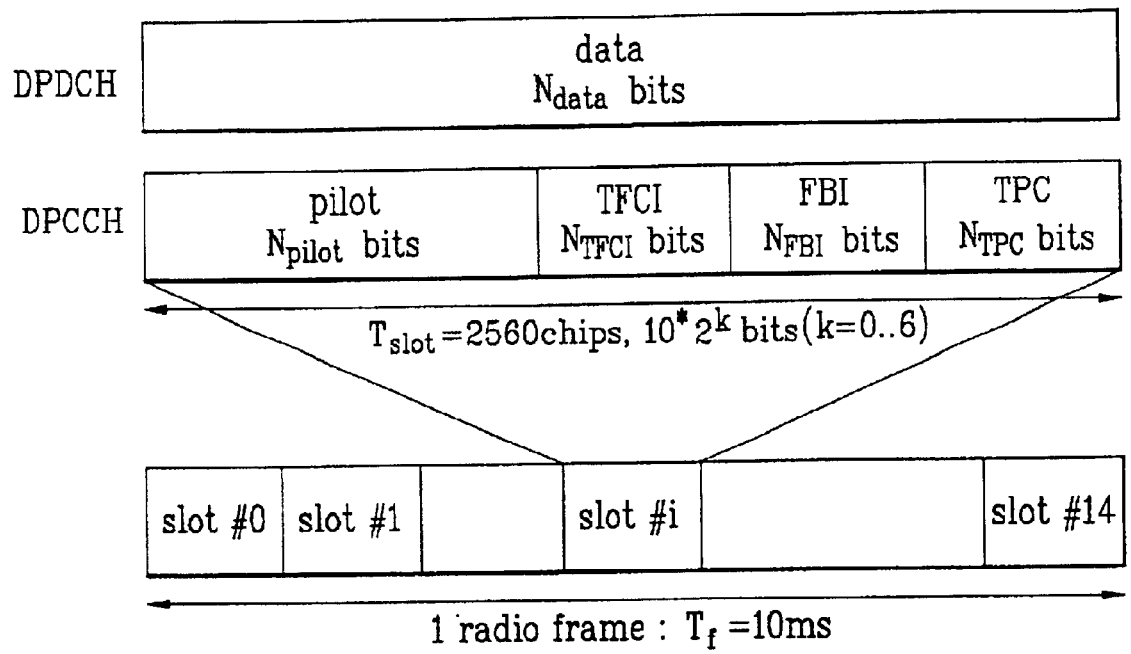
FIG. 3 illustrates a structure of an uplink DPCH of 3GPP RAN standard.

Reference will now be made in detail to the preferred embodiments of the present invention, examples of which are illustrated in the accompanying drawings. The embodiments of the present invention will be described focused onto pilot patterns used in an uplink DPCH and a downlink DPCH. However, the present invention is applicable to all channels, which use pilot patterns in the uplink and the downlink. FIG. 3 illustrates a structure of an uplink DPCH of 3GPP RAN standard. The following table 2 shows information on each field of an uplink DPDCH, and the next table 3 shows information on each field of a downlink DPDCH.

TABLE 2

| Slot format #I | Channel bit rate (kbps) | Channel symbol rate (ksps) | Spreading factor | Bits/ frame | Bits/ slot | $N_{data}$ |
|---|---|---|---|---|---|---|
| 0 | 15 | 15 | 256 | 150 | 10 | 10 |
| 1 | 30 | 30 | 128 | 300 | 20 | 20 |
| 2 | 60 | 60 | 64 | 600 | 40 | 40 |
| 3 | 120 | 120 | 32 | 1200 | 80 | 80 |
| 4 | 240 | 240 | 16 | 2400 | 160 | 160 |
| 5 | 480 | 480 | 8 | 4800 | 320 | 320 |
| 6 | 960 | 960 | 4 | 9600 | 640 | 640 |

TABLE 3

| Slot format #I | Channel bit rate (kbps) | Channel symbol rate (ksps) | S.F. | Bits/ frame | Bits/ slot | $N_{pilot}$ | 1* | 2* | $N_{FBI}$ | Transmitted slots/ frame |
|---|---|---|---|---|---|---|---|---|---|---|
| 0  | 15 | 15 | 256 | 150 | 10 | 6 | 2 | 2 | 0 | 15 |
| 0A | 15 | 15 | 256 | 150 | 10 | 5 | 2 | 3 | 0 | 10–14 |
| 0B | 15 | 15 | 256 | 150 | 10 | 4 | 2 | 4 | 0 | 8–9 |
| 1  | 15 | 15 | 256 | 150 | 10 | 8 | 2 | 0 | 0 | 8–15 |
| 2  | 15 | 15 | 256 | 150 | 10 | 5 | 2 | 2 | 1 | 15 |
| 2A | 15 | 15 | 256 | 150 | 10 | 4 | 2 | 3 | 1 | 10–14 |
| 2B | 15 | 15 | 256 | 150 | 10 | 3 | 2 | 4 | 1 | 8–9 |
| 3  | 15 | 15 | 256 | 150 | 10 | 7 | 2 | 0 | 1 | 8–15 |
| 4  | 15 | 15 | 256 | 150 | 10 | 6 | 2 | 0 | 2 | 8–15 |
| 5  | 15 | 15 | 256 | 150 | 10 | 5 | 1 | 2 | 2 | 15 |
| 5A | 15 | 15 | 256 | 150 | 10 | 4 | 1 | 3 | 2 | 10–14 |
| 5B | 15 | 15 | 256 | 150 | 10 | 3 | 1 | 4 | 2 | 8–9 |

S.F.: Spreading Factor,
1*: $N_{TPC}$,
2*: $N_{TFCI}$

As shown in table 3, a slot format of the DPCCH having the TFCI is changed in the compressed mode. That is, as shown in table 3, there are two more modes having separate indices added thereto. For an example, the slot format #2 is for field information of a general mode, and the slot formats #2A and #2B are for field information for the compressed mode. As can be known from the whole table 3, a number of transmissive slots per a frame are 15 in the general mode, and minimum 8 in the compressed mode. That is, at least 8 slots of information are transmitted in the compressed mode. The following table 4 shows pilot bit patterns of an uplink DPCCH having the present invention applied thereto, wherein a number of pilot bits $N_{pilot}$ in a slot is 3, 4, 5, or 6. The next table 5 shows pilot bit patterns of an uplink DPCCH having the present invention applied thereto, wherein a number of pilot bits $N_{pilot}$ in a slot is 7, or 8.

TABLE 4

Pilot bit patterns for uplink DPCCH with Npilot = 3, 4, 5 and 6

| | Npilot = 3 | | | Npilot = 4 | | | | Npilot = 5 | | | | | Npilot = 6 | | | | | |
|---|---|---|---|---|---|---|---|---|---|---|---|---|---|---|---|---|---|---|
| Bit# | 0 | 1 | 2 | 0 | 1 | 2 | 3 | 0 | 1 | 2 | 3 | 4 | 0 | 1 | 2 | 3 | 4 | 5 |
| Slot #0 | 1 | 1 | 1 | 1 | 1 | 1 | 1 | 1 | 1 | 1 | 1 | 0 | 1 | 1 | 1 | 1 | 1 | 0 |
| 1 | 0 | 0 | 1 | 1 | 0 | 0 | 1 | 0 | 0 | 1 | 1 | 0 | 1 | 0 | 0 | 1 | 1 | 0 |
| 2 | 0 | 1 | 1 | 1 | 0 | 1 | 1 | 0 | 1 | 1 | 0 | 1 | 1 | 0 | 1 | 1 | 0 | 1 |
| 3 | 0 | 0 | 1 | 1 | 0 | 0 | 1 | 0 | 0 | 1 | 0 | 0 | 1 | 0 | 0 | 1 | 0 | 0 |
| 4 | 1 | 0 | 1 | 1 | 1 | 0 | 1 | 1 | 0 | 1 | 0 | 1 | 1 | 1 | 0 | 1 | 0 | 1 |
| 5 | 1 | 1 | 1 | 1 | 1 | 1 | 1 | 1 | 1 | 1 | 1 | 0 | 1 | 1 | 1 | 1 | 1 | 0 |
| 6 | 1 | 1 | 1 | 1 | 1 | 1 | 1 | 1 | 1 | 1 | 0 | 0 | 1 | 1 | 1 | 1 | 0 | 0 |
| 7 | 1 | 0 | 1 | 1 | 1 | 0 | 1 | 1 | 0 | 1 | 0 | 0 | 1 | 1 | 0 | 1 | 0 | 0 |
| 8 | 0 | 1 | 1 | 1 | 0 | 1 | 1 | 0 | 1 | 1 | 1 | 0 | 1 | 0 | 1 | 1 | 1 | 0 |
| 9 | 1 | 1 | 1 | 1 | 1 | 1 | 1 | 1 | 1 | 1 | 1 | 1 | 1 | 1 | 1 | 1 | 1 | 1 |
| 10 | 0 | 1 | 1 | 1 | 0 | 1 | 1 | 0 | 1 | 1 | 0 | 1 | 1 | 0 | 1 | 1 | 0 | 1 |
| 11 | 1 | 0 | 1 | 1 | 1 | 0 | 1 | 1 | 0 | 1 | 1 | 1 | 1 | 1 | 0 | 1 | 1 | 1 |
| 12 | 1 | 0 | 1 | 1 | 1 | 0 | 1 | 1 | 0 | 1 | 0 | 0 | 1 | 1 | 0 | 1 | 0 | 0 |
| 13 | 0 | 0 | 1 | 1 | 0 | 0 | 1 | 0 | 0 | 1 | 1 | 1 | 1 | 0 | 0 | 1 | 1 | 1 |
| 14 | 0 | 0 | 1 | 1 | 0 | 0 | 1 | 0 | 0 | 1 | 1 | 1 | 1 | 0 | 0 | 1 | 1 | 1 |
| | $C_1$ | $C_2$ | | | $C_1$ | $C_2$ | | | $C_1$ | $C_2$ | $C_3$ | $C_4$ | | $C_1$ | $C_2$ | | $C_3$ | $C_4$ |

TABLE 5

Pilot bit patterns for uplink DPCCH with Npilot = 7 and 8

| | Npilot = 7 | | | | | | | Npilot = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| Slot #0 | 1 | 1 | 1 | 1 | 1 | 0 | 1 | 1 | 1 | 1 | 1 | 1 | 1 | 1 | 0 |
| 1 | 1 | 0 | 0 | 1 | 1 | 0 | 1 | 1 | 0 | 1 | 0 | 1 | 1 | 1 | 0 |
| 2 | 1 | 0 | 1 | 1 | 0 | 1 | 1 | 1 | 0 | 1 | 1 | 1 | 0 | 1 | 1 |
| 3 | 1 | 0 | 0 | 1 | 0 | 0 | 1 | 1 | 0 | 1 | 0 | 1 | 0 | 1 | 0 |
| 4 | 1 | 1 | 0 | 1 | 0 | 1 | 1 | 1 | 1 | 1 | 0 | 1 | 0 | 1 | 1 |
| 5 | 1 | 1 | 1 | 1 | 1 | 0 | 1 | 1 | 1 | 1 | 1 | 1 | 1 | 1 | 0 |
| 6 | 1 | 1 | 1 | 1 | 0 | 0 | 1 | 1 | 1 | 1 | 1 | 1 | 0 | 1 | 0 |
| 7 | 1 | 1 | 0 | 1 | 0 | 0 | 1 | 1 | 1 | 1 | 0 | 1 | 0 | 1 | 0 |

TABLE 5-continued

Pilot bit patterns for uplink DPCCH with Npilot = 7 and 8

| | Npilot = 7 | | | | | | | Npilot = 8 | | | | | | | |
|---|---|---|---|---|---|---|---|---|---|---|---|---|---|---|---|
| Bit # | 0 | 1 | 2 | 3 | 4 | 5 | 6 | 0 | 1 | 2 | 3 | 4 | 5 | 6 | 7 |
| 8 | 1 | 0 | 1 | 1 | 1 | 0 | 1 | 1 | 0 | 1 | 1 | 1 | 1 | 1 | 0 |
| 9 | 1 | 1 | 1 | 1 | 1 | 1 | 1 | 1 | 1 | 1 | 1 | 1 | 1 | 1 | 1 |
| 10 | 1 | 0 | 1 | 1 | 0 | 1 | 1 | 1 | 0 | 1 | 1 | 1 | 0 | 1 | 1 |
| 11 | 1 | 1 | 0 | 1 | 1 | 1 | 1 | 1 | 1 | 1 | 0 | 1 | 1 | 1 | 1 |
| 12 | 1 | 1 | 0 | 1 | 0 | 0 | 1 | 1 | 1 | 1 | 0 | 1 | 0 | 1 | 0 |
| 13 | 1 | 0 | 0 | 1 | 1 | 1 | 1 | 1 | 0 | 1 | 0 | 1 | 1 | 1 | 1 |
| 14 | 1 | 0 | 0 | 1 | 1 | 1 | 1 | 1 | 0 | 1 | 0 | 1 | 1 | 1 | 1 |
| | $C_1$ | $C_2$ | | $C_3$ | $C_4$ | | | $C_1$ | | $C_2$ | | $C_3$ | | $C_4$ | |

In the pilot patterns shown in tables 4 and 5, the shadowed parts are used for frame synchronization, and pilot bit values of rest of the parts are "1". Columnar sequences each with a bit value of "1" in all are used for channel estimation for coherent detection. Each of the columnar sequences with a length 15 marked with shadow in tables 4 and 5 is the frame synchronization in table 1 explained already used for the frame synchronization. Relations of mapping between the columnar sequences for the frame synchronization shown in tables 4 and 5 and the frame synchronization words in table 1 are shown in the following table 6.

TABLE 6

| $N_{pilot}$ | Position # of pilot bits | 15bit length columnar sequence of pilot pattern |
|---|---|---|
| 3 | 0 | C1 |
| | 1 | C2 |
| 4 | 1 | C1 |
| | 2 | C2 |
| 5 | 0 | C1 |
| | 1 | C2 |
| | 3 | C3 |
| | 4 | C4 |
| 6 | 1 | C1 |
| | 2 | C2 |
| | 4 | C3 |
| | 5 | C4 |
| 7 | 1 | C1 |
| | 2 | C2 |
| | 4 | C3 |
| | 5 | C4 |
| 8 | 1 | C1 |
| | 3 | C2 |
| | 5 | C3 |
| | 7 | C4 |

As explained, the codes C1, C2, C3, and C4 form code pairs in classes E and F. Particularly, when an uplink DPCH Npilot=3, a relation of C1 and C2 for respective bit# can be known from the following table 7.

TABLE 7

| | | | $N_{pilot} = 3$ | | |
|---|---|---|---|---|---|
| | | Bit # | 0 | 1 | 2 |
| Frame # K | Slot #0 | | $C_{1,0} = -C_{2,7}$ | $C_{2,0} = -C_{1,8}$ | 1 |
| | 1 | | $C_{1,1} = -C_{2,8}$ | $C_{2,1} = -C_{1,9}$ | 1 |
| | 2 | | $C_{1,2} = -C_{2,9}$ | $C_{2,2} = -C_{1,10}$ | 1 |
| | 3 | | $C_{1,3} = -C_{2,10}$ | $C_{2,3} = -C_{1,11}$ | 1 |
| | 4 | | $C_{1,4} = -C_{2,11}$ | $C_{2,4} = -C_{1,12}$ | 1 |
| | 5 | | $C_{1,5} = -C_{2,12}$ | $C_{2,5} = -C_{1,13}$ | 1 |
| | 6 | | $C_{1,6} = -C_{2,13}$ | $C_{2,6} = -C_{1,14}$ | 1 |
| | 7 | | $C_{1,7} = -C_{2,14}$ | $C_{2,7} = -C_{1,0}$ | 1 |
| | 8 | | $C_{1,8} = -C_{2,0}$ | $C_{2,8} = -C_{1,1}$ | 1 |
| | 9 | | $C_{1,9} = -C_{2,1}$ | $C_{2,9} = -C_{1,2}$ | 1 |
| | 10 | | $C_{1,10} = -C_{2,2}$ | $C_{2,10} = -C_{1,3}$ | 1 |
| | 11 | | $C_{1,11} = -C_{2,3}$ | $C_{2,11} = -C_{1,4}$ | 1 |
| | 12 | | $C_{1,12} = -C_{2,4}$ | $C_{2,12} = -C_{1,5}$ | 1 |
| | 13 | | $C_{1,13} = -C_{2,5}$ | $C_{2,13} = -C_{1,6}$ | 1 |
| | 14 | | $C_{1,14} = -C_{2,6}$ | $C_{2,14} = -C_{1,7}$ | 1 |
| Frame # K + 1 | Slot #0 | | $C_{1,0} = -C_{2,7}$ | $C_{2,0} = -C_{1,8}$ | 1 |
| | 1 | | $C_{1,1} = -C_{2,8}$ | $C_{2,1} = -C_{1,9}$ | 1 |
| | 2 | | $C_{1,2} = -C_{2,9}$ | $C_{2,2} = -C_{1,10}$ | 1 |
| | 3 | | $C_{1,3} = -C_{2,10}$ | $C_{2,3} = -C_{1,11}$ | 1 |
| | 4 | | $C_{1,4} = -C_{2,11}$ | $C_{2,4} = -C_{1,12}$ | 1 |
| | 5 | | $C_{1,5} = -C_{2,12}$ | $C_{2,5} = -C_{1,13}$ | 1 |
| | 6 | | $C_{1,6} = -C_{2,13}$ | $C_{2,6} = -C_{1,14}$ | 1 |
| | 7 | | $C_{1,7} = -C_{2,14}$ | $C_{2,7} = -C_{1,0}$ | 1 |
| | ... | | ... | ... | ... |

In table 7, which corresponds to Table 7 on page 33-15 of Korean Patent Application No. 7328/2000, Ci,j represents a (j)th slot bit of a pilot bit pattern Ci. When the uplink DPCH Npilot=6, relation between C1 and C2, and C3 and C4 for respective bit# can be known from the following table 8

TABLE 8

| | | | | $N_{pilot} = 6$ | | | | |
|---|---|---|---|---|---|---|---|---|
| | | Bit # | 0 | 1 | 2 | 3 | 4 | 5 |
| Frame # K | Slot #0 | | 1 | $C_{1,0} = -C_{2,7}$ | $C_{2,0} = -C_{1,8}$ | 1 | $C_{3,0} = -C_{4,7}$ | $C_{4,0} = -C_{3,8}$ |
| | 1 | | 1 | $C_{1,1} = -C_{2,8}$ | $C_{2,1} = -C_{1,9}$ | 1 | $C_{3,1} = -C_{4,8}$ | $C_{4,1} = -C_{3,9}$ |
| | 2 | | 1 | $C_{1,2} = -C_{2,9}$ | $C_{2,2} = -C_{1,10}$ | 1 | $C_{3,2} = -C_{4,9}$ | $C_{4,2} = -C_{3,10}$ |
| | 3 | | 1 | $C_{1,3} = -C_{2,10}$ | $C_{2,3} = -C_{1,11}$ | 1 | $C_{3,3} = -C_{4,10}$ | $C_{4,3} = -C_{3,11}$ |
| | 4 | | 1 | $C_{1,4} = -C_{2,11}$ | $C_{2,4} = -C_{1,12}$ | 1 | $C_{3,4} = -C_{4,11}$ | $C_{4,4} = -C_{3,12}$ |
| | 5 | | 1 | $C_{1,5} = -C_{2,12}$ | $C_{2,5} = -C_{1,13}$ | 1 | $C_{3,5} = -C_{4,12}$ | $C_{4,5} = -C_{3,13}$ |
| | 6 | | 1 | $C_{1,6} = -C_{2,13}$ | $C_{2,6} = -C_{1,14}$ | 1 | $C_{3,6} = -C_{4,13}$ | $C_{4,6} = -C_{3,14}$ |
| | 7 | | 1 | $C_{1,7} = -C_{2,14}$ | $C_{2,7} = -C_{1,0}$ | 1 | $C_{3,7} = -C_{4,14}$ | $C_{4,7} = -C_{3,0}$ |

TABLE 8-continued

| | | $N_{pilot} = 6$ | | | | | |
|---|---|---|---|---|---|---|---|
| Bit # | | 0 | 1 | 2 | 3 | 4 | 5 |
| | 8 | 1 | $C_{1,8} = -C_{2,0}$ | $C_{2,8} = -C_{1,1}$ | 1 | $C_{3,8} = -C_{4,0}$ | $C_{4,8} = -C_{3,1}$ |
| | 9 | 1 | $C_{1,9} = -C_{2,1}$ | $C_{2,9} = -C_{1,2}$ | 1 | $C_{3,9} = -C_{4,1}$ | $C_{4,9} = -C_{3,2}$ |
| | 10 | 1 | $C_{1,10} = -C_{2,2}$ | $C_{2,10} = -C_{1,3}$ | 1 | $C_{3,10} = -C_{4,2}$ | $C_{4,10} = -C_{3,3}$ |
| | 11 | 1 | $C_{1,11} = -C_{2,3}$ | $C_{2,11} = -C_{1,4}$ | 1 | $C_{3,11} = -C_{4,3}$ | $C_{4,11} = -C_{3,4}$ |
| | 12 | 1 | $C_{1,12} = -C_{2,4}$ | $C_{2,12} = -C_{1,5}$ | 1 | $C_{3,12} = -C_{4,4}$ | $C_{4,12} = -C_{3,5}$ |
| | 13 | 1 | $C_{1,13} = -C_{2,5}$ | $C_{2,13} = -C_{1,6}$ | 1 | $C_{3,13} = -C_{4,5}$ | $C_{4,13} = -C_{3,6}$ |
| | 14 | 1 | $C_{1,14} = -C_{2,6}$ | $C_{2,14} = -C_{1,7}$ | 1 | $C_{3,14} = -C_{4,6}$ | $C_{4,14} = -C_{3,7}$ |
| Frame # K + 1 | Slot #0 | 1 | $C_{1,0} = -C_{2,7}$ | $C_{2,0} = -C_{1,8}$ | 1 | $C_{3,0} = -C_{4,7}$ | $C_{4,0} = -C_{3,8}$ |
| | 1 | 1 | $C_{1,1} = -C_{2,8}$ | $C_{2,1} = -C_{1,9}$ | 1 | $C_{3,1} = -C_{4,8}$ | $C_{4,1} = -C_{3,9}$ |
| | 2 | 1 | $C_{1,2} = -C_{2,9}$ | $C_{2,2} = -C_{1,10}$ | 1 | $C_{3,2} = -C_{4,9}$ | $C_{4,2} = -C_{3,10}$ |
| | 3 | 1 | $C_{1,3} = -C_{2,10}$ | $C_{2,3} = -C_{1,11}$ | 1 | $C_{3,3} = -C_{4,10}$ | $C_{4,3} = -C_{3,11}$ |
| | 4 | 1 | $C_{1,4} = -C_{2,11}$ | $C_{2,4} = -C_{1,12}$ | 1 | $C_{3,4} = -C_{4,11}$ | $C_{4,4} = -C_{3,12}$ |
| | 5 | 1 | $C_{1,5} = -C_{2,12}$ | $C_{2,5} = -C_{1,13}$ | 1 | $C_{3,5} = -C_{4,12}$ | $C_{4,5} = -C_{3,13}$ |
| | 6 | 1 | $C_{1,6} = -C_{2,13}$ | $C_{2,6} = -C_{1,14}$ | 1 | $C_{3,6} = -C_{4,13}$ | $C_{4,6} = -C_{3,14}$ |
| | 7 | 1 | $C_{1,7} = -C_{2,14}$ | $C_{2,7} = -C_{1,0}$ | 1 | $C_{3,7} = -C_{4,14}$ | $C_{4,7} = -C_{3,0}$ |
| ... | | ... | ... | ... | ... | ... | ... |

In this instance too, in table 8, which corresponds to Table 8 on page 33-16 of Korean Patent Application No. 7328/2000, $C_{i,j}$ represents a (j)th slot bit of a pilot bit pattern $C_i$. The present invention facilitates to know information on not transmitted slots in the compressed mode by using respective code relations of the pilot bit patterns, and particularly, pilot bit patterns can be restored in frames for the frame synchronization. At first, four codes used in the uplink pilot bits can be expressed with classes E and F as follows.

$$E=\{C_1, C_2\}, F=\{C_3, C_4\}$$

As can be known from tables 7 and 8, respective two codes in each class has a relation as expressed by the following equations 7 and 8.

$$C_{i,j} = -C_{i,(j+7) \bmod 15} \quad (7)$$

$$C_{i+1,j} = -C_{i,(j+8) \bmod 15} \quad (8),$$

Where, i=1, 3 and j=0~14, which are integers. According to this, when an uplink DPCCH is transmitted over 8 slots in the compressed mode, not transmitted information bits among the pilot bit pattern C1 expressed in the following equation (9) are restored by using the equation (7).

$$15-\gamma, \ 8 \leq \gamma \leq 14 \quad (9)$$

In a similar method, not transmitted information bits of the pilot bit pattern C2 are restored by using the equation (8). At the end, not only the not transmitted information bits of the pilot bit patterns in the class E, but also not transmitted information bits of all pilot bit patterns in the class F in the compressed mode, can be restored by using equations (7) and (8). For an example, the (15−γ) not transmitted information bits of the pilot bit pattern C3 are restored by the equation (7), and the not transmitted information bits of the pilot bit pattern C4 are restored by the equation (8). This is made possible because two codes in the same class have a complementary relation.

Figure 4:
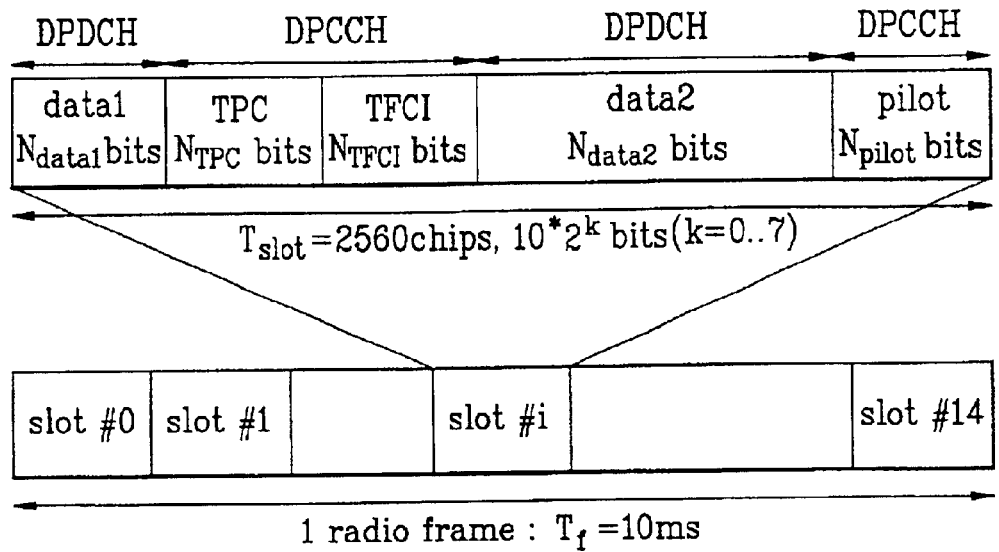
FIG. 4 illustrates a structure of a downlink DPCH of 3GPP RAN standard.

FIG. 4 illustrates a structure of a downlink DPCH of 3GPP RAN standard, wherein a parameter 'k' denotes a total number of bits in one slot in a DPCH. The parameter 'k' is related to an SF(Spreading Factor), with (SF)=512/2k, to fix the SF to be 4~512. The following table 9 shows a part of field information on the downlink DPCCH.

TABLE 9

| | | | | | DPDCH and DPCCH fields | | | | | |
|---|---|---|---|---|---|---|---|---|---|---|
| Slot Format #1 | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
| | | | | | $N_{Data1}$ | $N_{Data2}$ | $N_{TPC}$ | $N_{TFCI}$ | Npilot | |
| 0 | 15 | 7.5 | 512 | 10 | 0 | 4 | 2 | 0 | 4 | 15 |
| 0A | 15 | 7.5 | 512 | 10 | 0 | 4 | 2 | 0 | 4 | 8–14 |
| 0B | 30 | 15 | 256 | 20 | 0 | 8 | 4 | 0 | 8 | 8–14 |
| 1 | 15 | 7.5 | 512 | 10 | 0 | 2 | 2 | 2 | 4 | 15 |
| 1B | 30 | 15 | 256 | 20 | 0 | 4 | 4 | 4 | 8 | 8–14 |
| 2 | 30 | 15 | 256 | 20 | 2 | 14 | 2 | 0 | 2 | 15 |
| 2A | 30 | 15 | 256 | 20 | 2 | 14 | 2 | 0 | 2 | 8–14 |
| 2B | 60 | 30 | 128 | 40 | 4 | 28 | 4 | 0 | 4 | 8–14 |
| 3 | 30 | 15 | 256 | 20 | 2 | 12 | 2 | 2 | 2 | 15 |
| 3A | 30 | 15 | 256 | 20 | 2 | 10 | 2 | 4 | 2 | 8–14 |
| 3B | 60 | 30 | 128 | 40 | 4 | 24 | 4 | 4 | 4 | 8–14 |
| 4 | 30 | 15 | 256 | 20 | 2 | 12 | 2 | 0 | 4 | 15 |
| 4A | 30 | 15 | 256 | 20 | 2 | 12 | 2 | 0 | 4 | 8–14 |
| 4B | 60 | 30 | 128 | 40 | 4 | 24 | 4 | 0 | 8 | 8–14 |

TABLE 9-continued

DPDCH and DPCCH fields

| Slot Format #1 | Channel Bit Rate (kbps) | Channel Symbol Rate (ksps) | SF | Bits/ Slot | DPDCH Bits/Slot | | DPCCH Bits/Slot | | | Transmitted slots per radio frame $N_{Tr}$ |
|---|---|---|---|---|---|---|---|---|---|---|
| | | | | | $N_{Data1}$ | $N_{Data2}$ | $N_{TPC}$ | $N_{TFCI}$ | Npilot | |
| 5 | 30 | 15 | 256 | 20 | 2 | 10 | 2 | 2 | 4 | 15 |
| 5A | 30 | 15 | 256 | 20 | 2 | 8 | 2 | 4 | 4 | 8–14 |
| 5B | 60 | 30 | 128 | 40 | 4 | 20 | 4 | 4 | 8 | 8–14 |
| 6 | 30 | 15 | 256 | 20 | 2 | 8 | 2 | 0 | 8 | 15 |
| 6A | 30 | 15 | 256 | 20 | 2 | 8 | 2 | 0 | 8 | 8–14 |
| 6B | 60 | 30 | 128 | 40 | 4 | 16 | 4 | 0 | 16 | 8–14 |
| 7 | 30 | 15 | 256 | 20 | 2 | 6 | 2 | 2 | 8 | 15 |
| 7A | 30 | 15 | 256 | 20 | 2 | 4 | 2 | 4 | 8 | 8–14 |
| 7B | 60 | 30 | 128 | 40 | 4 | 12 | 4 | 4 | 16 | 8–14 |
| 8 | 60 | 30 | 128 | 40 | 6 | 28 | 2 | 0 | 4 | 15 |
| 8A | 60 | 30 | 128 | 40 | 6 | 28 | 2 | 0 | 4 | 8–14 |
| 8B | 120 | 60 | 64 | 80 | 12 | 56 | 4 | 0 | 8 | 8–14 |
| 9 | 60 | 30 | 128 | 40 | 6 | 26 | 2 | 2 | 4 | 15 |
| 9A | 60 | 30 | 128 | 40 | 6 | 24 | 2 | 4 | 4 | 8–14 |
| 9B | 120 | 60 | 64 | 80 | 12 | 52 | 4 | 4 | 8 | 8–14 |
| 10 | 60 | 30 | 128 | 40 | 6 | 24 | 2 | 0 | 8 | 15 |
| 10A | 60 | 30 | 128 | 40 | 6 | 24 | 2 | 0 | 8 | 8–14 |
| 10B | 120 | 60 | 64 | 80 | 12 | 48 | 4 | 0 | 16 | 8–14 |
| 11 | 60 | 30 | 128 | 40 | 6 | 22 | 2 | 2 | 8 | 15 |
| 11A | 60 | 30 | 128 | 40 | 6 | 20 | 2 | 4 | 8 | 8–14 |
| 11B | 120 | 60 | 64 | 80 | 12 | 44 | 4 | 4 | 16 | 8–14 |
| 12 | 120 | 60 | 64 | 80 | 12 | 48 | 4 | 8* | 8 | 15 |
| 12A | 120 | 60 | 64 | 80 | 12 | 40 | 4 | 16* | 8 | 8–14 |
| 12B | 240 | 120 | 32 | 160 | 24 | 96 | 8 | 16* | 16 | 8–14 |
| 13 | 240 | 120 | 32 | 160 | 28 | 112 | 4 | 8* | 8 | 15 |
| 13A | 240 | 120 | 32 | 160 | 28 | 104 | 4 | 16* | 8 | 8–14 |
| 13B | 480 | 240 | 16 | 320 | 56 | 224 | 8 | 16* | 16 | 8–14 |
| 14 | 480 | 240 | 16 | 320 | 56 | 232 | 8 | 8* | 16 | 15 |
| 14A | 480 | 240 | 16 | 320 | 56 | 224 | 8 | 16* | 16 | 8–14 |
| 14B | 960 | 480 | 8 | 640 | 112 | 464 | 16 | 16* | 32 | 8–14 |
| 15 | 960 | 480 | 8 | 640 | 120 | 488 | 8 | 8* | 16 | 15 |
| 15A | 960 | 480 | 8 | 640 | 120 | 480 | 8 | 16* | 16 | 8–14 |
| 15B | 1920 | 960 | 4 | 1280 | 240 | 976 | 16 | 16 | 32 | 8–14 |
| 16 | 1920 | 960 | 4 | 1280 | 248 | 1000 | 8 | 8* | 16 | 15 |
| 16A | 1920 | 960 | 4 | 1280 | 248 | 992 | 8 | 16* | 16 | 8–14 |

The DPCH may or may not have the TFCI. Particularly, a slot format that is different from one in a general mode is used in the compressed mode. That is, there are two more modes having separate indices added thereto as shown in table 9 in the compressed mode, wherein an 'A' type slot format is used as a transmission time reduction method, and a 'B' type slot format is used as a spreading factor reduction method. For an example, the slot format #3 is for field information in a general mode, and slot formats #3A and #3B are for field information in the compressed mode. As can be known from the whole table 9, a number of slots transmissive per a frame in the general mode are 15, and minimum 8 in the compressed mode. In other words, at least 8 slot information is transmitted even in the compressed mode. In a case a B type slot format is used as a spreading factor reduction method in a downlink compressed mode, two times of TPC bits and two times of pilot field bits are transmitted, when symbols are repeated. For an example, the bits of the two fields are represented with $x_1, x_2, x_3, - - -, x_x$ in the general mode, corresponding bits of the two fields in the compressed mode are transmitted repeatedly in an order of $x_1, x_2, x_1, x_2, x_3, x_4, x_3, x_4, - - -, x_x, x_x$. The following table 10 shows pilot symbol patterns of a downlink DPCCH having the present invention applied thereto, wherein pilot symbols $N_{pilot}$ in one slot form 2, 4, 8, and 16 bit pilot symbol patterns.

TABLE 10

Pilot bitpatterns for downlink DPCCH with Npilot = 2, 4, 8 and 16

| | Npilot = 2 | Npilot = 4 | | Npilot = 8 | | | | Npilot = 16 | | | | | | | |
|---|---|---|---|---|---|---|---|---|---|---|---|---|---|---|---|
| Symbol # | 0 | 0 | 1 | 0 | 1 | 2 | 3 | 0 | 1 | 2 | 3 | 4 | 5 | 6 | 7 |
| Slot #0 | 11 | 11 | 11 | 11 | 11 | 11 | 10 | 11 | 11 | 11 | 10 | 11 | 11 | 11 | 10 |
| 1 | 00 | 11 | 00 | 11 | 00 | 11 | 10 | 11 | 00 | 11 | 10 | 11 | 11 | 11 | 00 |
| 2 | 01 | 11 | 01 | 11 | 01 | 11 | 01 | 11 | 01 | 11 | 01 | 11 | 10 | 11 | 00 |
| 3 | 00 | 11 | 00 | 11 | 00 | 11 | 00 | 11 | 00 | 11 | 00 | 11 | 01 | 11 | 10 |
| 4 | 10 | 11 | 10 | 11 | 10 | 11 | 01 | 11 | 10 | 11 | 01 | 11 | 11 | 11 | 11 |

TABLE 10-continued

Pilot bitpatterns for downlink DPCCH with Npilot = 2, 4, 8 and 16

| Symbol # | Npilot = 2 | Npilot = 4 | | Npilot = 8 | | | | Npilot = 16 | | | | | | | |
|---|---|---|---|---|---|---|---|---|---|---|---|---|---|---|---|
| | 0 | 0 | 1 | 0 | 1 | 2 | 3 | 0 | 1 | 2 | 3 | 4 | 5 | 6 | 7 |
| 5 | 11 | 11 | 11 | 11 | 11 | 11 | 10 | 11 | 11 | 11 | 10 | 11 | 01 | 11 | 01 |
| 6 | 11 | 11 | 11 | 11 | 11 | 11 | 00 | 11 | 11 | 11 | 00 | 11 | 10 | 11 | 11 |
| 7 | 10 | 11 | 10 | 11 | 10 | 11 | 00 | 11 | 10 | 11 | 00 | 11 | 10 | 11 | 00 |
| 8 | 01 | 11 | 01 | 11 | 01 | 11 | 10 | 11 | 01 | 11 | 10 | 11 | 00 | 11 | 11 |
| 9 | 11 | 11 | 11 | 11 | 11 | 11 | 11 | 11 | 11 | 11 | 11 | 11 | 00 | 11 | 11 |
| 10 | 01 | 11 | 01 | 11 | 01 | 11 | 01 | 11 | 01 | 11 | 01 | 11 | 11 | 11 | 10 |
| 11 | 10 | 11 | 10 | 11 | 10 | 11 | 11 | 11 | 10 | 11 | 11 | 11 | 00 | 11 | 10 |
| 12 | 10 | 11 | 10 | 11 | 10 | 11 | 00 | 11 | 10 | 11 | 00 | 11 | 01 | 11 | 01 |
| 13 | 00 | 11 | 00 | 11 | 00 | 11 | 11 | 11 | 00 | 11 | 11 | 11 | 00 | 11 | 00 |
| 14 | 00 | 11 | 00 | 11 | 00 | 11 | 11 | 11 | 00 | 11 | 11 | 11 | 10 | 11 | 01 |
| | $C_1C_2$ | $C_1C_2$ | | $C_1C_2$ | | 2 | $C_3C_4$ | 0 | $C_1C_2$ | 2 | $C_3C_4$ | 4 | $C_5C_6$ | 6 | $C_7C_8$ |

In the pilot patterns in table 10, shadowed parts among the entire pilot symbols are used for the frame synchronization, and rest of the parts have a value '1'. The columnar sequences having symbol value of '1' is used for channel estimation for coherent detection. Relations of mapping between the columnar sequences for the frame synchronization in table 10 and the frame synchronization words in table 1 are shown in table 11.

TABLE 11

| Symbol rate | Symbol # | Channel | 15bit length columnar sequence of pilot pattern |
|---|---|---|---|
| Npilot = 2 | 0 | I-CH | C1 |
| | | Q-CH | C2 |
| Npilot = 4 | 1 | I-CH | C1 |
| | | Q-CH | C2 |
| Npilot = 8 | 1 | I-CH | C1 |
| | | Q-CH | C2 |

TABLE 11-continued

| Symbol rate | Symbol # | Channel | 15bit length columnar sequence of pilot pattern |
|---|---|---|---|
| | 3 | I-CH | C3 |
| | | Q-CH | C4 |
| Npilot = 16 | 1 | I-CH | C1 |
| | | Q-CH | C2 |
| | 3 | I-CH | C3 |
| | | Q-CH | C4 |
| | 5 | I-CH | C5 |
| | | Q-CH | C6 |
| | 7 | I-CH | C7 |
| | | Q-CH | C8 |

Particularly, in a case the downlink DPCH $N_{pilot}=8$, relations between C1 and C2, and C3 and C4 for respective symbol # can be known from the following table 12.

TABLE 12

| | | $N_{pilot} = 8$ | | | | |
|---|---|---|---|---|---|---|
| Symbol # | | 0 | 1 | 2 | 3 | 5 |
| Frame # K | Slot #0 | 11 $C_{1,0} = -C_{2,7}$ | $C_{2,0} = -C_{1,8}$ | 11 $C_{3,0} = -C_{4,7}$ | $C_{4,0} = -C_{3,8}$ | |
| | 1 | 11 $C_{1,1} = -C_{2,8}$ | $C_{2,1} = -C_{1,9}$ | 11 $C_{3,1} = -C_{4,8}$ | $C_{4,1} = -C_{3,9}$ | |
| | 2 | 11 $C_{1,2} = -C_{2,9}$ | $C_{2,2} = -C_{1,10}$ | 11 $C_{3,2} = -C_{4,9}$ | $C_{4,2} = -C_{3,10}$ | |
| | 3 | 11 $C_{1,3} = -C_{2,10}$ | $C_{2,3} = -C_{1,11}$ | 11 $C_{3,3} = -C_{4,10}$ | $C_{4,3} = -C_{3,11}$ | |
| | 4 | 11 $C_{1,4} = -C_{2,11}$ | $C_{2,4} = -C_{1,12}$ | 11 $C_{3,4} = -C_{4,11}$ | $C_{4,4} = -C_{3,12}$ | |
| | 5 | 11 $C_{1,5} = -C_{2,12}$ | $C_{2,5} = -C_{1,13}$ | 11 $C_{3,5} = -C_{4,12}$ | $C_{4,5} = -C_{3,13}$ | |
| | 6 | 11 $C_{1,6} = -C_{2,13}$ | $C_{2,6} = -C_{1,14}$ | 11 $C_{3,6} = -C_{4,13}$ | $C_{4,6} = -C_{3,14}$ | |
| | 7 | 11 $C_{1,7} = -C_{2,14}$ | $C_{2,7} = -C_{1,0}$ | 11 $C_{3,7} = -C_{4,14}$ | $C_{4,7} = -C_{3,0}$ | |
| | 8 | 11 $C_{1,8} = -C_{2,0}$ | $C_{2,8} = -C_{1,1}$ | 11 $C_{3,8} = -C_{4,0}$ | $C_{4,8} = -C_{3,1}$ | |
| | 9 | 11 $C_{1,9} = -C_{2,1}$ | $C_{2,9} = -C_{1,2}$ | 11 $C_{3,9} = -C_{4,1}$ | $C_{4,9} = -C_{3,2}$ | |
| | 10 | 11 $C_{1,10} = -C_{2,2}$ | $C_{2,10} = -C_{1,3}$ | 11 $C_{3,10} = -C_{4,2}$ | $C_{4,10} = -C_{3,3}$ | |
| | 11 | 11 $C_{1,11} = -C_{2,3}$ | $C_{2,11} = -C_{1,4}$ | 11 $C_{3,11} = -C_{4,3}$ | $C_{4,11} = -C_{3,4}$ | |
| | 12 | 11 $C_{1,12} = -C_{2,4}$ | $C_{2,12} = -C_{1,5}$ | 11 $C_{3,12} = -C_{4,4}$ | $C_{4,12} = -C_{3,5}$ | |
| | 13 | 11 $C_{1,13} = -C_{2,5}$ | $C_{2,13} = -C_{1,6}$ | 11 $C_{3,13} = -C_{4,5}$ | $C_{4,13} = -C_{3,6}$ | |
| | 14 | 11 $C_{1,14} = -C_{2,6}$ | $C_{2,14} = -C_{1,7}$ | 11 $C_{3,14} = -C_{4,6}$ | $C_{4,14} = -C_{3,7}$ | |
| Frame # K + 1 | Slot #0 | 11 $C_{1,0} = -C_{2,7}$ | $C_{2,0} = -C_{1,8}$ | 11 $C_{3,0} = -C_{4,7}$ | $C_{4,0} = -C_{3,8}$ | |
| | 1 | 11 $C_{1,1} = -C_{2,8}$ | $C_{2,1} = -C_{1,9}$ | 11 $C_{3,1} = -C_{4,8}$ | $C_{4,1} = -C_{3,9}$ | |
| | 2 | 11 $C_{1,2} = -C_{2,9}$ | $C_{2,2} = -C_{1,10}$ | 11 $C_{3,2} = -C_{4,9}$ | $C_{4,2} = -C_{3,10}$ | |
| | 3 | 11 $C_{1,3} = -C_{2,10}$ | $C_{2,3} = -C_{1,11}$ | 11 $C_{3,3} = -C_{4,10}$ | $C_{4,3} = -C_{3,11}$ | |
| | 4 | 11 $C_{1,4} = -C_{2,11}$ | $C_{2,4} = -C_{1,12}$ | 11 $C_{3,4} = -C_{4,11}$ | $C_{4,4} = -C_{3,12}$ | |
| | 5 | 11 $C_{1,5} = -C_{2,12}$ | $C_{2,5} = -C_{1,13}$ | 11 $C_{3,5} = -C_{4,12}$ | $C_{4,5} = -C_{3,13}$ | |
| | 6 | 11 $C_{1,6} = -C_{2,13}$ | $C_{2,6} = -C_{1,14}$ | 11 $C_{3,6} = -C_{4,13}$ | $C_{4,6} = -C_{3,14}$ | |
| | 7 | 11 $C_{1,7} = -C_{2,14}$ | $C_{2,7} = -C_{1,0}$ | 11 $C_{3,7} = -C_{4,14}$ | $C_{4,7} = -C_{3,0}$ | |
| | ... | ... ... | ... | ... ... | ... | |

The Ci,j in table 12 which corresponds to Table 12 on page 33-22 of Korean Patent Application No. 7328/2000, represents a (j) th symbol of a pilot symbol pattern Ci. The present invention facilitates to know information on not transmitted slots in the mode by using relations of such downlink pilot symbol pattern codes, and particularly, to restore the pilot symbol patterns in frames for frame synchronization. Eight codes used in the downlink pilot symbol pattern are sorted in E, F, G, H classes as follows.

$$E=\{C_1, C_2\}, F=\{C_3, C_4\}, G=\{C_5, C_6\}, H=\{C_7, C_8\}$$

As can be known from the table 12, the two codes in each of the class have relations already explained in equations 7 and 8, except that, in the case of downlink, i=1, 3, 5, 7, and j=0~14, both of which are integers. Accordingly, when the downlink DPCCHs are transmitted over 8 slots in the compressed mode, a number of not transmitted information bits of the pilot symbols C1 are restored by using the equation (7), and a number of not transmitted information bits of the pilot symbols C2 are restored by using the equation (8). At the end, not only the not transmitted information bits of the pilot bit patterns in the class E, but also all the pilot bit patterns in classes F, G, and H, which are not transmitted in the compressed mode are restored by using the equations (7) and (8). For an example, the (15−γ) not transmitted information bits of the pilot bit patterns C1, C3, C5, C7 are restored by the equation (7), and the not transmitted information bits of the pilot bit patterns C2, C4, C6, and C8 are restored by the equation (8). This is made possible because two codes in the same class have a complementary relation. The following table 13 shows pilot symbol patterns of the pilot symbol patterns shown in table 10 having an STTD(Space Time Transmit Diversity) taken into account.

TABLE 14

| Symbol rate | Symbol # | Channel | 15bit length columnar sequence of pilot pattern |
|---|---|---|---|
| Npilot = 2 | 0 | I-CH | −C1 |
| | | Q-CH | C2 |
| Npilot = 4 | 0 | I-CH | −C1 |
| | | Q-CH | C2 |
| Npilot = 8 | 1 | I-CH | −C3 |
| | | Q-CH | C4 |
| | 3 | I-CH | C1 |
| | | Q-CH | −C2 |
| Npilot = 16 | 1 | I-CH | −C3 |
| | | Q-CH | C4 |
| | 3 | I-CH | C1 |
| | | Q-CH | −C2 |
| | 5 | I-CH | −C7 |
| | | Q-CH | C8 |
| | 7 | I-CH | C5 |
| | | Q-CH | −C6 |

Figure 6:
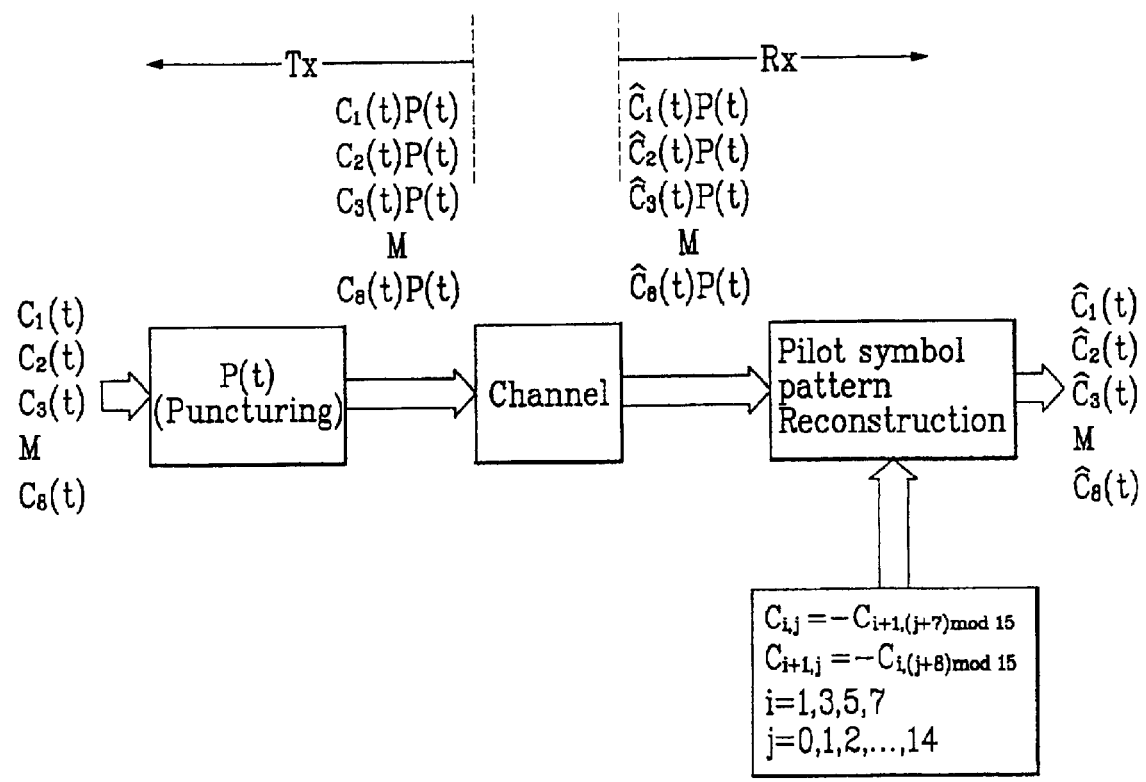
FIG. 6 illustrates a block diagram of a device for restoring a pilot pattern used for frame synchronization in a compressed mode of the present invention.

The information, thus STTD encoded, is STTD decoded, and not transmitted slot information thereof is restored according to the foregoing pilot symbol pattern restoring process. The restoring process explained up to now can be represented with a system of device as illustrated in FIG. 6. FIG. 6 illustrates a block diagram of a device for restoring a pilot pattern used for frame synchronization in a compressed mode of the present invention.

Since at least 8 slots are transmitted in the compressed mode, up to 7 slots are punctured in one frame. Functions for the frame synchronization words before and after the puncturing can be expressed as follows.

$$C1(t), C2(t), C3(t), ---, C8(t)$$

$$C1(t)P(t), C2(t)P(t), C3(t)P(t), ---, C8(t)P(t) \quad (10)$$

TABLE 13

Pilot bitpatterns for downlink DPCCH in STTD with Npilot = 2, 4, 8 and 16

| | Npilot = 2 | Npilot = 4 | | Npilot = 8 | | | | Npilot = 16 | | | | | | | |
|---|---|---|---|---|---|---|---|---|---|---|---|---|---|---|---|
| Symbol # | 0 | 0 | 1 | 0 | 1 | 2 | 3 | 0 | 1 | 2 | 3 | 4 | 5 | 6 | 7 |
| Slot #0 | 01 | 01 | 10 | 11 | 00 | 00 | 10 | 11 | 00 | 00 | 10 | 11 | 00 | 00 | 10 |
| 1 | 10 | 10 | 10 | 11 | 00 | 00 | 01 | 11 | 00 | 00 | 01 | 11 | 10 | 00 | 10 |
| 2 | 11 | 11 | 10 | 11 | 11 | 00 | 00 | 11 | 11 | 00 | 00 | 11 | 10 | 00 | 11 |
| 3 | 10 | 10 | 10 | 11 | 10 | 00 | 01 | 11 | 10 | 00 | 01 | 11 | 00 | 00 | 00 |
| 4 | 00 | 00 | 10 | 11 | 11 | 00 | 11 | 11 | 11 | 00 | 11 | 11 | 01 | 00 | 10 |
| 5 | 01 | 01 | 10 | 11 | 00 | 00 | 10 | 11 | 00 | 00 | 10 | 11 | 11 | 00 | 00 |
| 6 | 01 | 01 | 10 | 11 | 10 | 00 | 10 | 11 | 10 | 00 | 10 | 11 | 01 | 00 | 11 |
| 7 | 00 | 00 | 10 | 11 | 10 | 00 | 11 | 11 | 10 | 00 | 11 | 11 | 10 | 00 | 11 |
| 8 | 11 | 11 | 10 | 11 | 00 | 00 | 00 | 11 | 00 | 00 | 00 | 11 | 01 | 00 | 01 |
| 9 | 01 | 01 | 10 | 11 | 01 | 00 | 10 | 11 | 01 | 00 | 10 | 11 | 01 | 00 | 01 |
| 10 | 11 | 11 | 10 | 11 | 11 | 00 | 00 | 11 | 11 | 00 | 00 | 11 | 00 | 00 | 10 |
| 11 | 00 | 00 | 10 | 11 | 01 | 00 | 11 | 11 | 01 | 00 | 11 | 11 | 00 | 00 | 01 |
| 12 | 00 | 00 | 10 | 11 | 10 | 00 | 11 | 11 | 10 | 00 | 11 | 11 | 11 | 00 | 00 |
| 13 | 10 | 10 | 10 | 11 | 01 | 00 | 01 | 11 | 01 | 00 | 01 | 11 | 10 | 00 | 01 |
| 14 | 10 | 10 | 10 | 11 | 01 | 00 | 01 | 11 | 01 | 00 | 01 | 11 | 11 | 00 | 11 |

Figure 5:
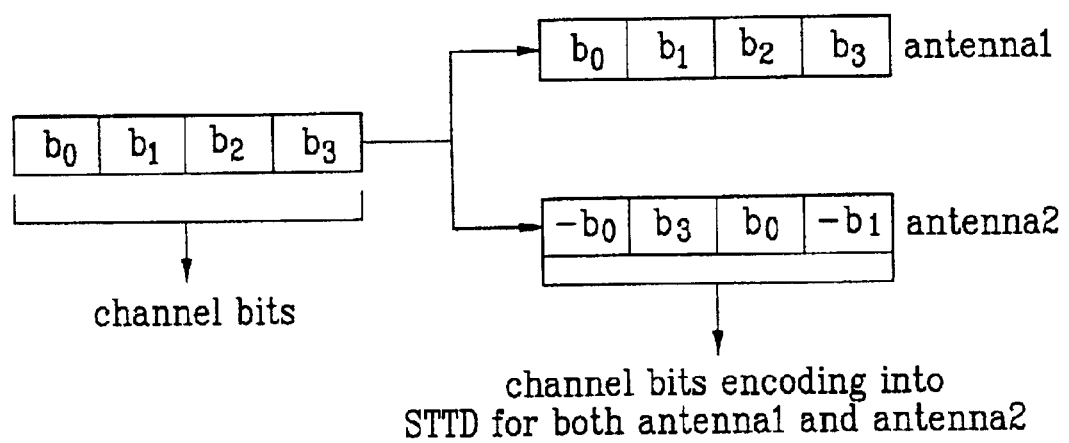
FIG. 5 explains an STTD encoding principle in downlink DPCH of 3GPP RAN standard.

The pilot symbol patterns in the table 13 are produced by an STTD encoding of which principle is shown in FIG. 5. Relations of mapping of the columnar sequences in table 13 and the frame synchronization words in table 1 are shown in the following table 14.

The frames punctured, and transmitted in the compressed mode have a noise component added thereto, to be expressed as follows.

$$\hat{C}_1(t)P(t), \hat{C}_2(t)P(t), \hat{C}_3(t)P(t), ---, \hat{C}_8(t) P(t) \quad (11)$$

Then, the received frame synchronization words as expressed in the following equation (12) are restored according to the pilot symbol pattern restoring process expressed in the foregoing equations, and the restored frame synchronization words are applied to correlators shown in FIGS. 7 and 8 for frame synchronization.

$$\hat{C}_1(t), \hat{C}_2(t), \hat{C}_3(t), ---, \hat{C}_8(t) \quad (12)$$

Figure 7:
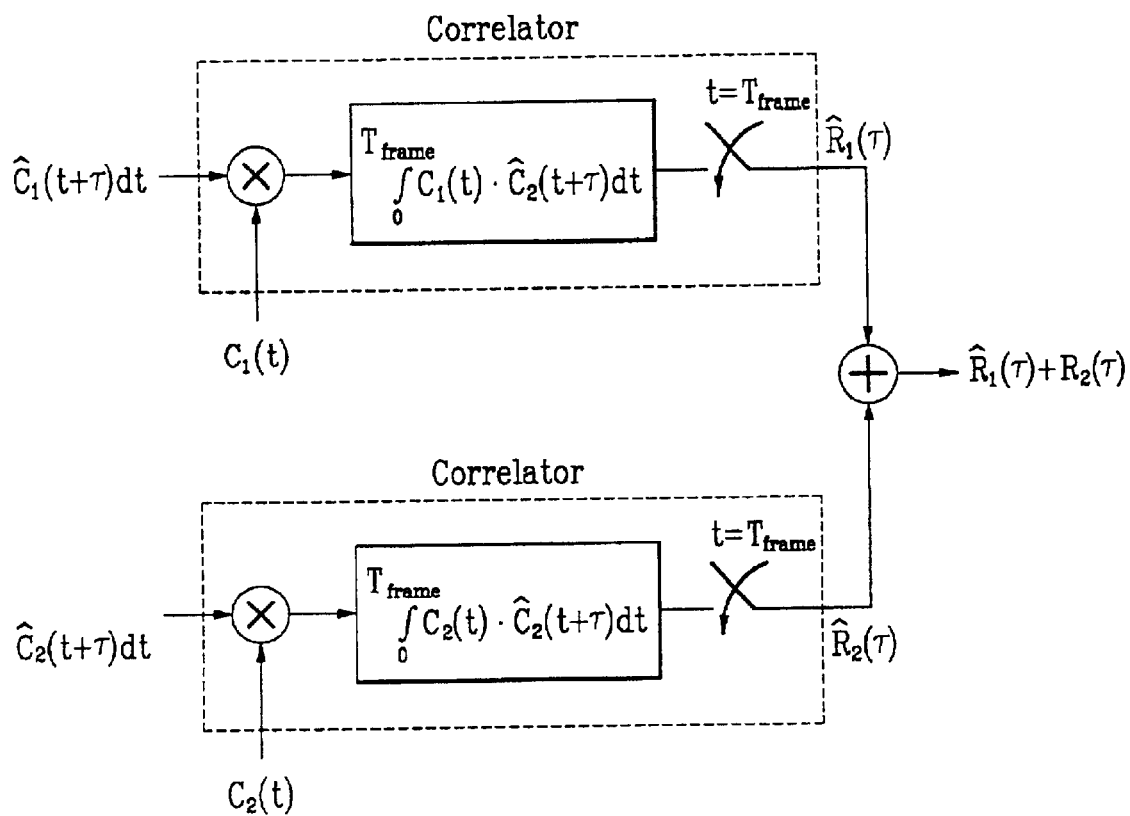
FIG. 7 illustrates a block diagram of an auto-correlation device for frame synchronization in accordance with a preferred embodiment of the present invention.
Figure 8:
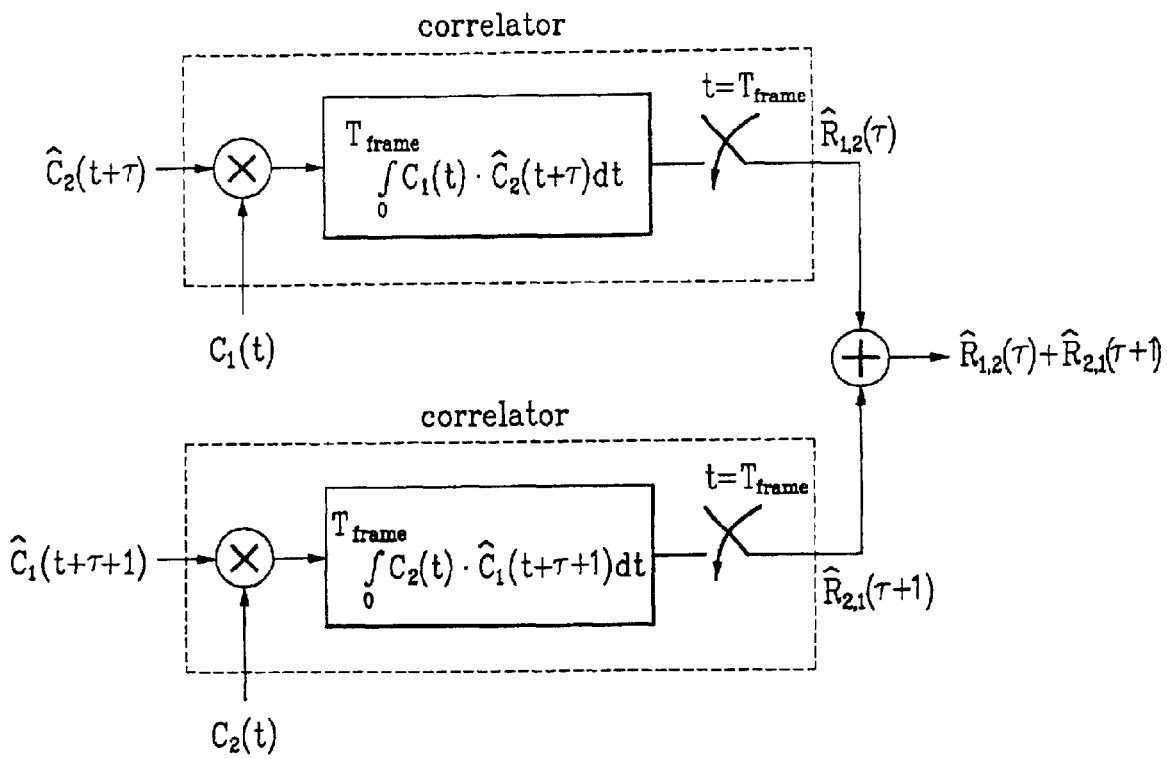
FIG. 8 illustrates a block diagram of a cross correlation device for frame synchronization in accordance with a preferred embodiment of the present invention.

FIG. 7 illustrates a block diagram of an auto-correlation device for frame synchronization in accordance with a preferred embodiment of the present invention, and FIG. 8 illustrates a block diagram of a cross correlation device for frame synchronization in accordance with a preferred embodiment of the present invention, wherein $T_{frame}$ represents one frame period, which is 10 msec in the present 3GPP standard. Once the frame synchronization words are restored according to the restoring process, the restored frame synchronization words are applied either to the auto-correlator in FIG. 7 or to the cross-correlator in FIG. 8. At the end, the present invention facilitates to attain and identify frame synchronization of the uplink and downlink DPCH even in a compressed mode by using method and device the same with a general mode, and can also realize detection of out-of synchronization. After comparing an output of the correlator over the frame time period given from the network through an upper layer to a specific threshold voltage, the receiver side reports success or failure of the frame synchronization to the upper layer.

Figure 9:
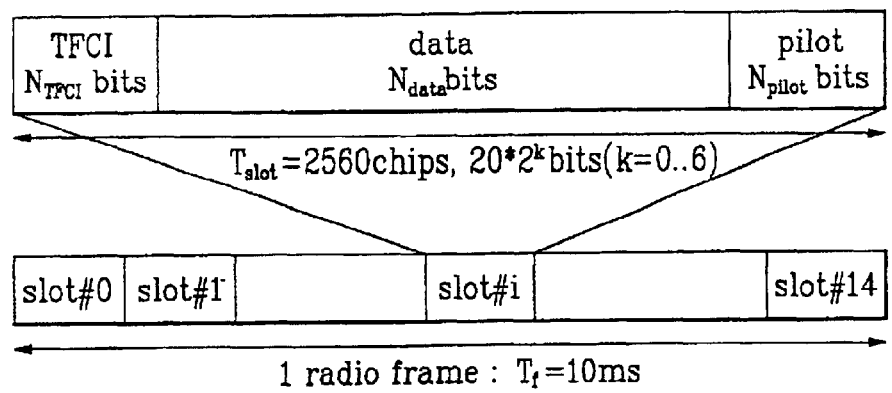
FIG. 9 illustrates a structure of SCCPCH of 3GPP RAN standard.

A method for identifying a frame synchronization and detecting an out-of frame synchronization in accordance with a preferred embodiment of the present invention will be explained, with reference to the attached drawings. This embodiment implements the frame synchronization and detecting the out-of frame synchronization by using one parameter 'Z'. The parameter 'Z' is obtained by combining the auto-correlation function and the cross correlation function of the pilot pattern. FIG. 9 illustrates a structure of SCCPCH(Secondary Common Control Physical Channel) of 3GPP RAN standard. The SCCPCH is used for transmission of FACH(Forward Access Channel) and a paging channel. The following table 15 shows field information on the SCCPCH.

TABLE 15

| Slot format #i | Channel bit rate (kbps) | Channel symbol rate (ksps) | S.F. | Bits/ frame | Bits/ slot | $N_{data}$ | N-pilot | $N_{TCFI}$ |
|---|---|---|---|---|---|---|---|---|
| 0 | 30 | 15 | 256 | 300 | 20 | 20 | 0 | 0 |
| 1 | 30 | 15 | 256 | 300 | 20 | 12 | 8 | 0 |
| 2 | 30 | 15 | 256 | 300 | 20 | 18 | 0 | 2 |
| 3 | 30 | 15 | 256 | 300 | 20 | 10 | 8 | 2 |
| 4 | 60 | 30 | 128 | 600 | 40 | 40 | 0 | 0 |
| 5 | 60 | 30 | 128 | 600 | 40 | 32 | 8 | 0 |
| 6 | 60 | 30 | 128 | 600 | 40 | 38 | 0 | 2 |
| 7 | 60 | 30 | 128 | 600 | 40 | 30 | 8 | 2 |
| 8 | 120 | 60 | 64 | 1200 | 80 | 72 | 0 | 8* |
| 9 | 120 | 60 | 64 | 1200 | 80 | 64 | 8 | 8* |
| 10 | 240 | 120 | 32 | 2400 | 160 | 152 | 0 | 8* |
| 11 | 240 | 120 | 32 | 2400 | 160 | 144 | 8 | 8* |
| 12 | 480 | 240 | 16 | 4800 | 320 | 312 | 0 | 8* |
| 13 | 480 | 240 | 16 | 4800 | 320 | 296 | 16 | 8* |
| 14 | 960 | 480 | 8 | 9600 | 640 | 632 | 0 | 8* |
| 15 | 960 | 480 | 8 | 9600 | 640 | 616 | 16 | 8* |
| 16 | 1920 | 960 | 4 | 19200 | 1280 | 1272 | 0 | 8* |
| 17 | 1920 | 960 | 4 | 19200 | 1280 | 1256 | 16 | 8* |

S.F.: Spreading Factor.

The slots with 8 bit or 16 bit pilot symbols $N_{pilot}$ in the table 10 represent pilot symbol patterns of the SCCPCH having the present invention applied thereto. In the downlink pilot patterns shown in table 10, shadowed parts among the whole pilot symbols are used for frame synchronization, and a pilot symbol except the parts has a value '1'. The columnar sequences with all symbol value '1' are used for channel estimation for coherent detection. The table 13 shows pilot symbol patterns in the table 10 having STTD taken into account. The pilot symbol patterns in the table 13 are produced by subjecting the SCCPCH symbols to STTD encoding as shown in FIG. 5 when there is a diversity antenna on the network side or the SCCPCH is transmitted by using an open loop transmit diversity.

Figure 1A:
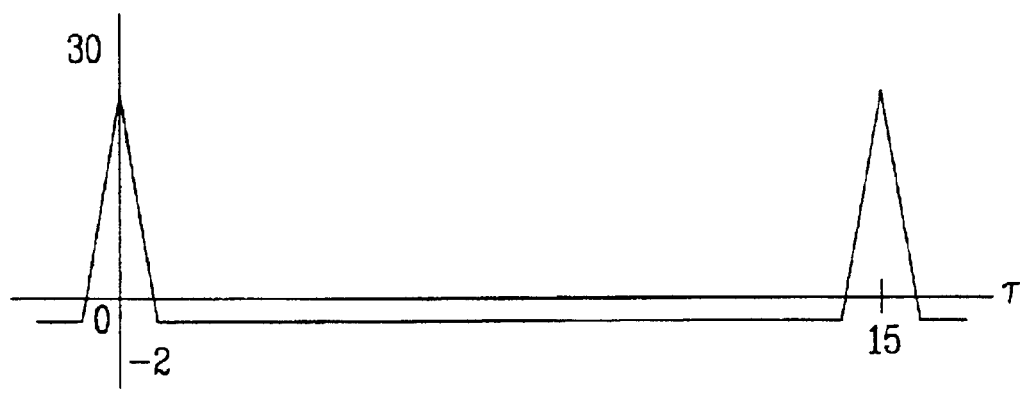
FIG. 1A illustrates a graph showing an auto-correlation when $\alpha=2$ by using pilot patterns of 3GPP RAN standard.
Figure 1B:
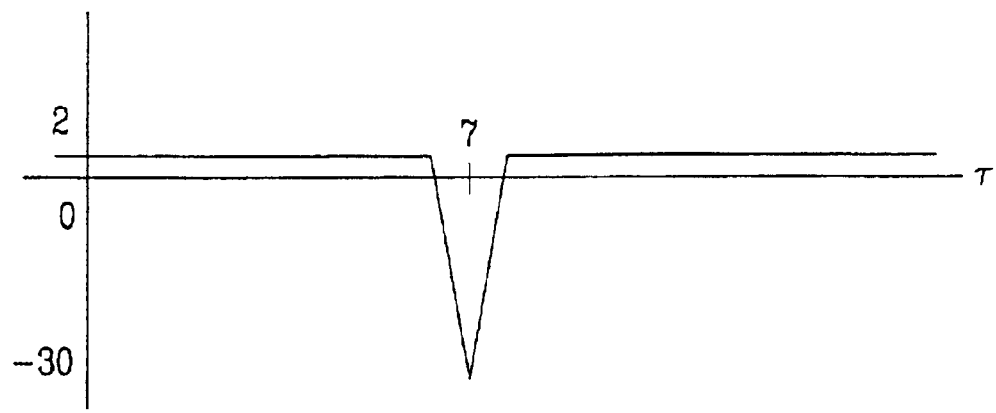
FIG. 1B illustrates a graph showing a cross-correlation when $\alpha=2$ by using pilot patterns of 3GPP RAN standard.
Figure 2A:
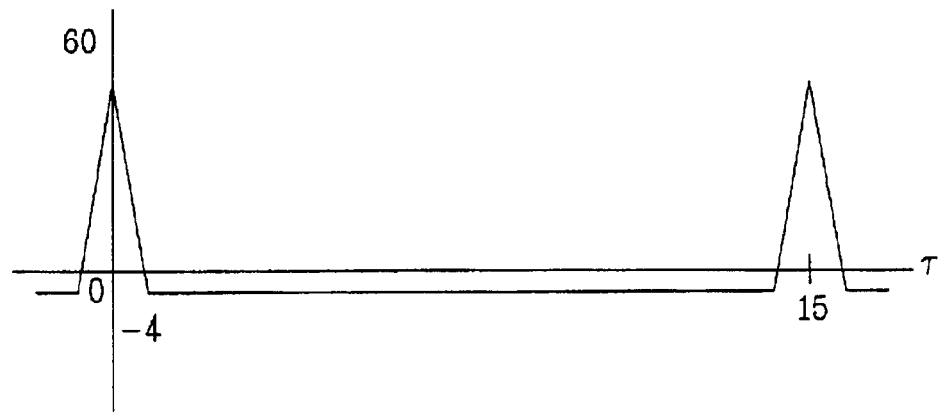
FIG. 2A illustrates a graph showing an auto-correlation when $\alpha=4$ by using pilot patterns of 3GPP RAN standard.
Figure 2B:
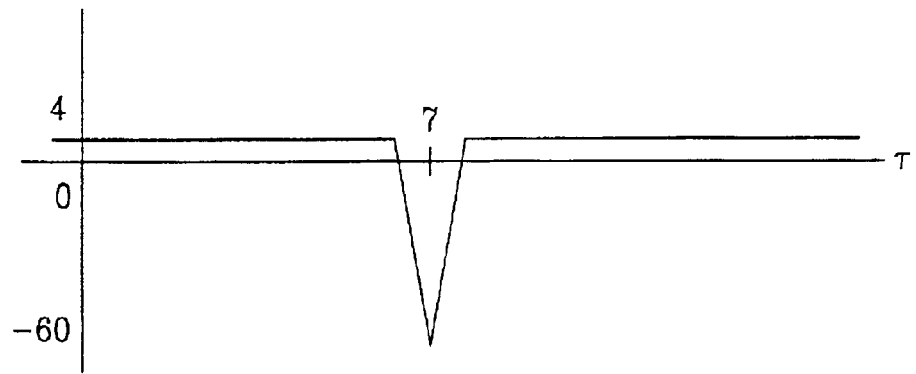
FIG. 2B illustrates a graph showing a cross-correlation when $\alpha=4$ by using pilot patterns of 3GPP RAN standard.

It is very important that the receiver side of the next generation mobile communication system attains the frame synchronization by using the pilot patterns of the channels explained up to now. The combination, and simultaneous use of the auto-correlation and cross-correlation facilitate double check of the frame synchronization identification and the out-of frame synchronization detection. The provided that output both of the auto-correlator in FIG. 7 and the cross correlator are referred on the same time, the double check in one frame is possible. As explained, FIG. 7 illustrates a block diagram of an auto-correlation device for frame synchronization identification and out-of frame synchronization detection in accordance with a preferred embodiment of the present invention, wherein the frame synchronization is identified in frames by using an auto-correlation result in forms as shown in FIGS. 1A and 1B, when an output of the auto-correlator is compared with a preset positive '+' threshold value, for identification of the frame synchronization. As explained, FIG. 8 illustrates a block diagram of a cross correlation device for frame synchronization identification and out-of frame synchronization detection in accordance with a preferred embodiment of the present invention, for frame synchronization identification by using the cross correlation result in forms shown in FIGS. 1B or 2B, when an output the cross correlator is compared to a present negative '−' threshold value for the frame synchronization identification. In the correlators in FIGS. 7 and 8, $T_{frame}$ represents one frame time period, which is 10 msec in the present 3GPP standard. However, if the correlators in FIGS. 7 and 8 are used individually, because the correlators make no difference with the related art in the frame synchronization identification and the out-of frame synchronization detection, basically the present invention combines outputs of the auto-correlator in FIG. 7 and the cross-correlator in FIG. 8 for the frame synchronization identification and the out-of frame synchronization detection. The present invention determines a success in the frame synchronization identification by using the parameter 'Z' shown in the following equation 13.

$$Z = \sum_{i=1}^{\alpha} R_i(0) - \sum_{i=1}^{\alpha/2} (R_{2i-1,2i}(7) + R_{2i,2i-1}(8)), \alpha = 2, 4, 6, 8 \quad (13)$$

The equation (13) has a prerequisite that there is no distortion of the radio channel, and the parameter 'Z' is a reference for determining success of the frame synchronization identification. When the success of the frame synchronization identification is determined, the parameter 'Z' has value as expressed in the following equation (14).

$$Z=\alpha/2 \cdot (30-(-30))=\alpha \cdot 30 \quad (14)$$

In a case the parameter 'Z' in the equation (14) is greater than a preset threshold value β, the case is determined to be a case the frame synchronization identification is in success.

Figure 10:
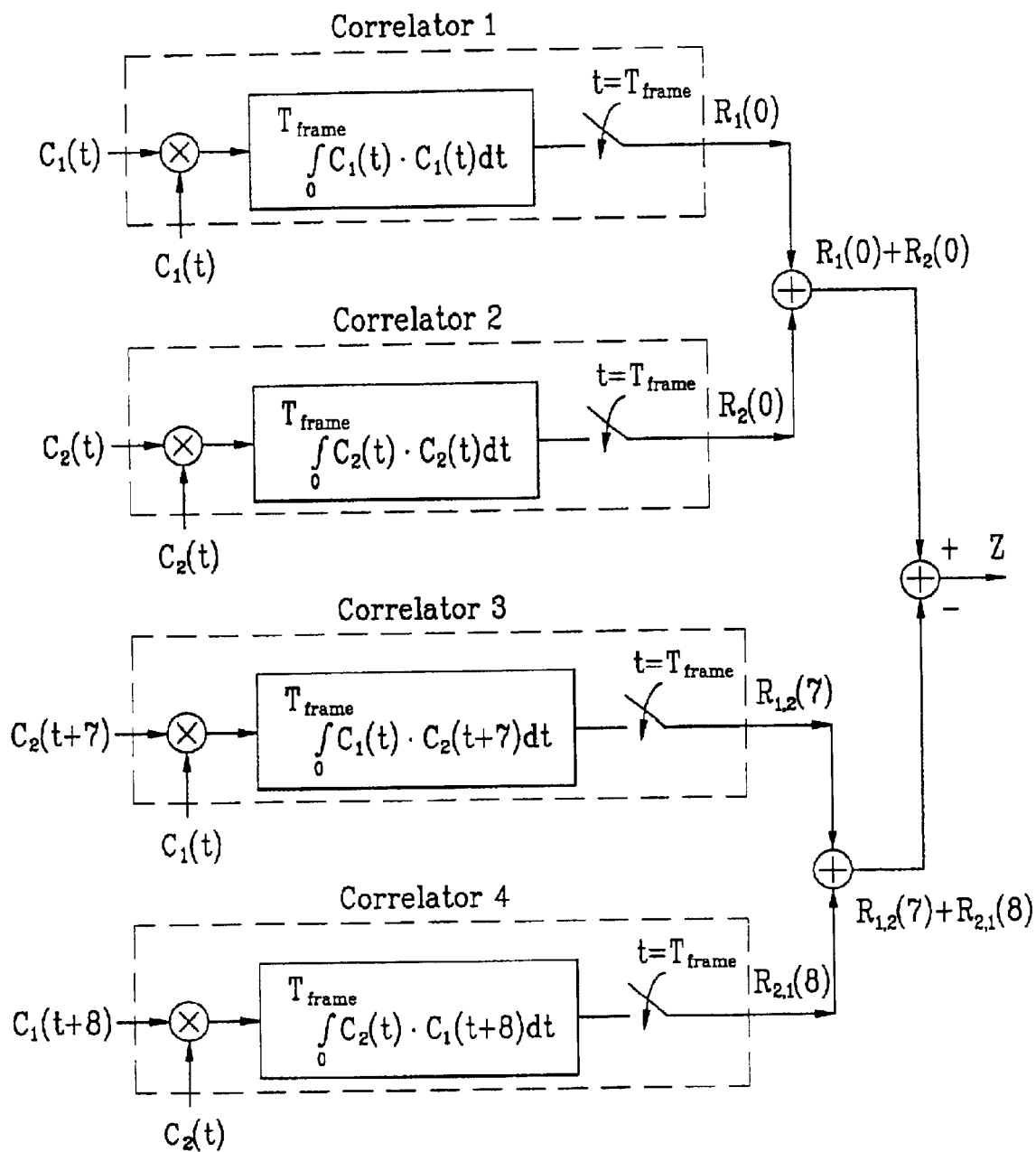
FIG. 10 illustrates a block diagram of a system of correlators for identification of frame synchronization and detection of out of frame synchronization in accordance with a preferred embodiment of the present invention.

Opposite to this, in a case the parameter 'Z' in the equation (14) is smaller than the preset threshold value β, the case is determined to be a case the frame synchronization identification is in failure. The threshold value β is set up to be flexible according to an SNR(Signal to Noise Ratio). If the present SNR is high, the threshold value β is set to be higher, and if the present SNR is lower, the threshold value β is set to be lower. As an example, in this embodiment, the threshold value is set to be "0" to cope with a case when the auto-correlation value that represents a positive '+' maximum correlation value is smaller than the cross correlation value that represents a negative '−' maximum correlation value, or a case when the cross correlation value that represents a negative '−' maximum correlation value is greater than the auto-correlation value that represents a positive '+' maximum correlation value, which can be occurred seldom in a very poor channel environment, when the out-of frame synchronization can be detected by setting the threshold value β=0. FIG. 10 illustrates a block diagram of a system of correlators for identification of frame synchronization and detection of out-of frame synchronization in accordance with a preferred embodiment of the present invention, referring to which a system of the correlators of the present invention will be explained in detail. The system of the correlators in FIG. 10 has α=2.

Referring to FIG. 10, a first correlator 1 and a second correlator 2 take auto correlation of received frame synchronization words, and a third correlator 3 and a fourth correlator 4 take cross correlation of received frame synchronization words. When a sum "R1(0)+R2(0)" of an output R1(0) of the first correlator 1 and an output R2(0) of the second correlator 2 are provided, and a sum "R1,7(7)+R2,1(8)" of an output R1,2(7) of the third correlator 3 and an output R2,1(8) of the fourth correlator 4 are provided, the parameter 'Z' can be calculated.

As explained, in a summing step, the auto-correlation result is delayed for certain slot time periods during the cross correlation is carried out. Then, the auto-correlation result and the cross correlation result are negative summed. In a step of carrying out an auto-correlation, restored frame synchronization words are classed into a number of classes corresponding to pairs of the frame synchronization words. Then, a first frame synchronization word and the second frame synchronization word of each class, i.e., each code pair, are auto-correlated, to produce a first auto-correlation result and a second auto-correlation result. Then, the first auto-correlation result and the second auto-correlation result are summed to produce a final auto-correlation result. In a step of carrying out a cross correlation, at first restored frame synchronization words are classed into a number of classes corresponding to pairs of the frame synchronization words. Then, a second frame synchronization word is cross correlated with respect to a first frame synchronization word, to obtain a first cross correlation result, and the first frame synchronization word is cross correlated with respect to the second frame synchronization word, to obtain a second cross correlation result delayed for a time period compared the first cross correlation result. Then, the first cross correlation result and the second cross correlation result are summed, to obtain a final cross correlation result.

The parameter 'Z' can be obtained by negatively adding the summed cross correlation result "R1,2(7)+R2,1(8) to the summed auto-correlation output "R1(0)+R2(0)", which is expressed in the equation (13). Owing to this, the present invention permits to obtain a correlation value two times greater the same in the related art in the case α=2 as shown in FIG. 14, that allows a more reliable frame synchronization identification. Then, the calculated parameter 'Z' is compared to a preset threshold value β. If the parameter 'Z' is greater than the threshold value β, it is determined that the frame synchronization identification is in success, and if the parameter 'Z' is smaller than the threshold value β, it is determined that the frame synchronization identification is in failure. Thereafter, the receiver side reports a result of the determination to the upper layer.

As has been explained, the method for synchronizing frames by using pilot patterns in a compressed mode of the present invention has the following advantages.

First, even in a case a W-CDMA mobile communication system is operated in a compressed mode, not to transmit all the 15 slots of one frame, the present invention permits to restore perfect frame synchronization words in frames by using dedicated pilot pattern. As correlation of the frame synchronization words restored thus can be used even in the compressed mode, the frame synchronization can be achieved by using device and method the same with a general mode.

Second, the appropriate combination of the auto-correlation function and the cross correlation function of the pilot patterns permits easy identification of the frame synchronization or easy out-of frame synchronization detection, that allows fast synchronization of successive frames.

Third, the application of more reliable correlation outputs in identification of the frame synchronization or out-of frame synchronization detection to all the next generation mobile communication systems using the pilot patterns of the present invention provides the same reference for all systems that use the same pilot patterns.

It will be apparent to those skilled in the art that various modifications and variations can be made in the method for synchronizing frames by using pilot patterns in a compressed mode of the present invention without departing from the spirit or scope of the invention. Thus, it is intended that the present invention cover the modifications and variations of this invention provided they come within the scope of the appended claims and their equivalents.

What is claimed is:

1. A method for synchronizing frames by using pilot patterns in a compressed mode at a mobile terminal, the method comprising:

(a) receiving compressed pilot bit sequences of frame synchronization words over a frame, pilot bit sequences being classified into pairs and two pilot bit sequences of each pair having a relation, one pilot bit sequence of each pair being the other pilot bit sequence shifted by a predetermined bit length and then inverted in accordance with the relation;

(b) restoring the pilot bit sequences of the frame synchronization words over the frame by using the relation; and (c) attaining a frame synchronization over the frame with respect to a channel using the restored pilot bit sequences.

2. The method as claimed in claim 1, wherein the step (b) includes;

restoring the pilot bit sequences from the compressed pilot bit sequences by using a relation $C_{i,j} = -C_{i+1,(j+7) \bmod 15}$ of each pair, wherein $C_{i,j}$ represents a (j)th slot bit of a pilot bit sequence $C_i$, i=1, 3, 5, 7, and j=0~14.

3. The method as claimed in claim 1, wherein the step (b) includes;

restoring the pilot bit sequences from the compressed pilot bit sequences by using a relation $C_{i+1,j} = -C_{i,(j+8) \bmod 15}$ of each pair, wherein $C_{i,j}$ represents a (j)th slot bit of a pilot bit sequence $C_i$, i=1, 3, 5, 7, and j=0~14.

4. The method as claimed in claim 1, wherein the step (c) includes;

classifying the restored pilot bit sequences of frame synchronization words into pair, and implementing the frame synchronization of the channel by using at least one of cross correlation functions of each pair.

5. The method as claimed in claim 4, wherein, if the restored pilot bit sequences of the frame synchronization words are eight, which can be classified into the following four pairs,

E={C1, C2}, F={C3, C4}, G={C5, C6}, H={C7, C8}, each pair can be expressed in a cross correlation function as the following equations, $$R_{i,j}(\tau) = \begin{cases} -15, & \tau = 7 \\ 1, & \tau \neq 7 \end{cases}$$

$$R_{j,i}(\tau+1) = \begin{cases} -15, & \tau = 7 \\ 1, & \tau \neq 7 \end{cases}$$

where i,j=1, 2, - - - , 8.

6. A method as claimed in claim 1, wherein the step (c) is implemented by at least one of auto-correlation function of the restored pilot bit sequences.

7. The method as claimed in claim 6, wherein, if the restored pilot bit sequences of the frame synchronization words are eight, which can be classified into the following four pairs,

E={C1, C2}, F={C3, C4}, G={C5, C6}, H={C7, C8}, each pilot sequence in each pair can be expressed in an auto-correlation function as the following equation, $$R_i(\tau) = \begin{cases} 15, & \tau = 0 \\ -1, & \tau \neq 0 \end{cases}, i, j = 1, 2, \ldots, 8.$$

8. The method as claimed in claim 1, wherein the step (c) is implemented by using both the auto-correlation and cross correlation of the restored pilot bit sequences of the frame synchronization words.

9. The method as claimed in claim 8, wherein the step (c) includes;

(a-1) auto-correlating the restored pilot bit sequences of the frame synchronization words to provide a final auto-correlation result, (b-1) cross correlating the pilot bit sequences of the restored frame synchronization words, to provide a final cross correlating result, (c-1) negatively summing the auto-correlation result and the cross correlation result, (d-1) comparing the summed correlation results to a preset threshold value β, (e-1) determining a frame synchronization success for the channel according to a result of the comparison, and (f-1) reporting the result of the determination to an upper layer.

10. The method as claimed in claim 9, wherein, in the cross correlating step, the restored pilot bit sequences of the frame synchronization words are classed into a number of pairs, and one pilot bit sequence of each pair is the other pilot bit sequence of each pair being cyclic shifted by 7 bits and inverted.

11. The method as claimed in claim 9, wherein the step (c-1) includes;

delaying the auto-correlation result for a certain slot time period while the cross correlation is carried out, and negatively summing the auto-correlation result and the cross correlation result.

12. The method as claimed in claim 9, wherein the threshold value β is set to a value equal to '0' or greater than '0' depending on a SNR (Signal to Noise Ratio) ratio.

13. The method as claimed in claim 9, wherein the step (a-1) includes;

classifying the restored pilot bit sequences of the frame synchronization words into a number of pairs, auto-correlating a first pilot bit sequence and a second pilot bit sequence in each pair, respectively, to provide a first auto-correlation result and a second auto-correlation result, and summing the first auto-correlation result and the second auto-correlation result, to provide the final auto-correlation result.

14. The method as claimed in claim 9, wherein the step (b-1) includes;

classifying the pilot bit sequences of the restored frame synchronization words into a number of pairs, cross correlating a second pilot bit sequence of the frame synchronization words of each pair with respect to a first pilot bit sequence of the frame synchronization words in each pair, to obtain a first cross correlation result, cross correlating the first pilot bit sequence of the frame synchronization words with respect to the second pilot bit sequence of the frame synchronization words in each pair, to obtain a second cross correlation result, and summing the first cross correlation result and the second cross correlation result, to obtain a final cross correlation result.

15. The method as claimed in claim 1, wherein, at a base station, the pilot bit sequences of the frame synchronization words are punctured over the frame for a desired number of slots upon transmission.

16. The method as claimed in claim 15, wherein the pilot bit sequences of the frame synchronization words punctured over the frame include seven bits at maximum.

* * * * *